April 19, 1955 J. F. DAVIDSON 2,706,398
LEAK DETECTION
Filed May 26, 1949 3 Sheets-Sheet 1
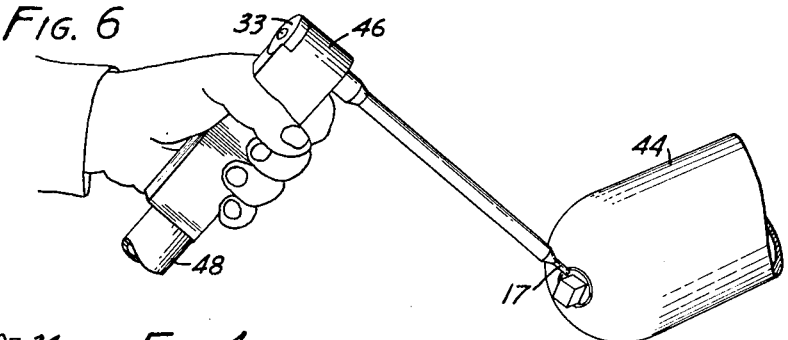
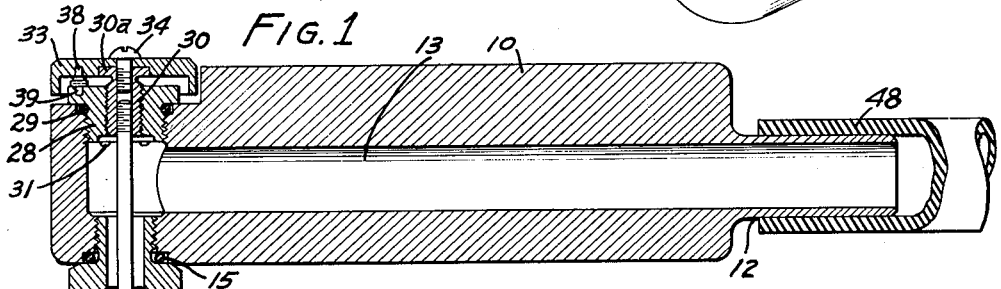
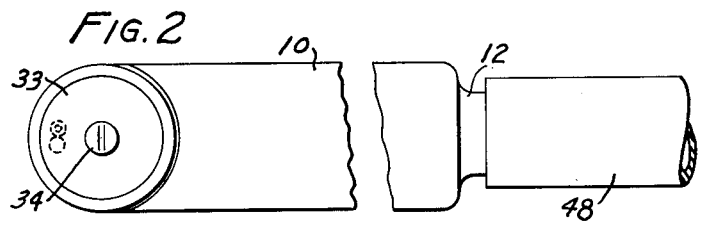
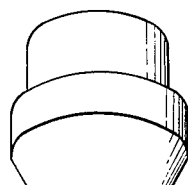
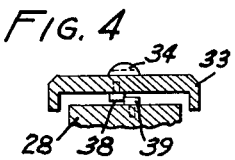
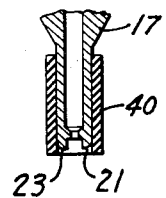
JOSEPH F. DAVIDSON,
INVENTOR.
BY
ATTORNEY.

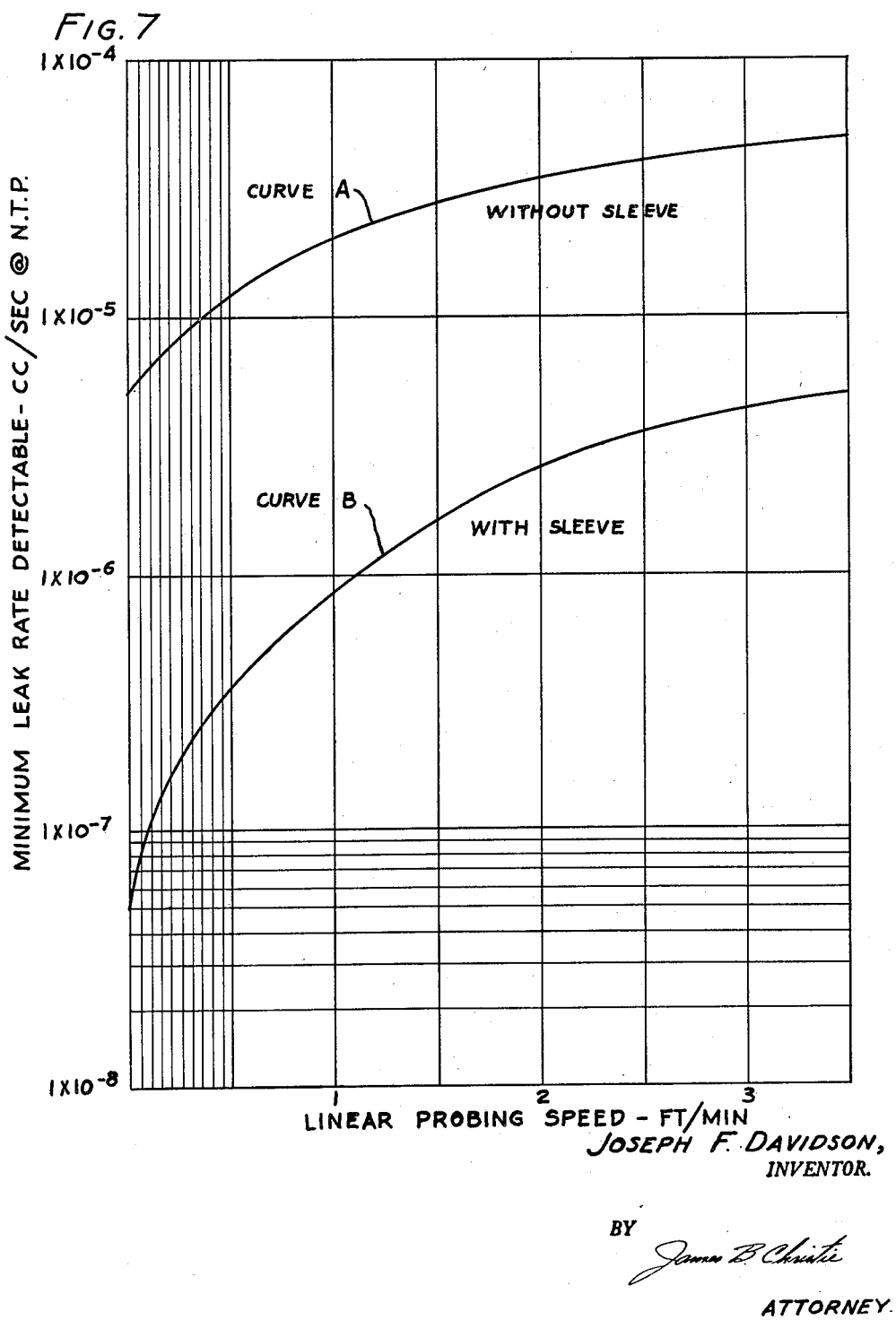

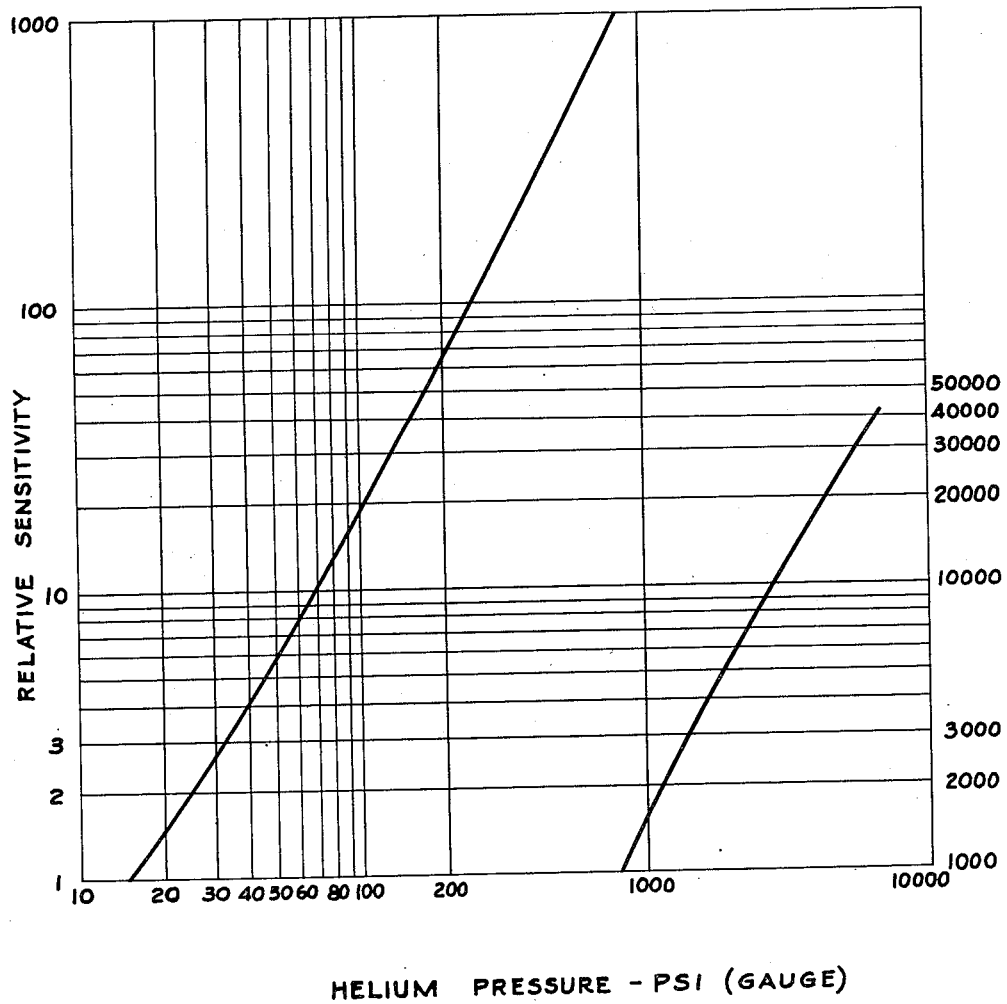

United States Patent Office 2,706,398
Patented Apr. 19, 1955

2,706,398

LEAK DETECTION

Joseph Frederick Davidson, Pasadena, Calif., assignor to Consolidated Engineering Corporation, Pasadena, Calif., a corporation of California Application May 26, 1949, Serial No. 95,441

10 Claims. (Cl. 73—40)

This invention relates to the detection of leaks in vessels, pipes and other closed systems and a "sniffing" probe particularly adapted to this use.

One presently practiced method of leak detection involves the use of a mass spectrometer designed particularly for such application. A mass spectrometer for such use has been previously described in copending United States patent application, Serial No. 662,291, filed April 15, 1946, by Clifford E. Berry now United States Patent 2,537,025, issued January 9, 1951. The present invention is not related to a mass spectrometer but the use of such instrument or the equivalent analytical instrument is necessary to the practice of the invention. Briefly, a mass spectrometer is a vacuum tube device for sorting ions according to their mass-to-charge ratio. Molecules introduced into the device are converted into ions, usually by thermal effect or by electron bombardment. The ions thus formed are propelled, generally as a heterogeneous beam into a magnetic field wherein the ions of differing mass-to-charge ratio fan out into a series of diverging beams, each beam composed of ions of the same mass-to-charge ratio. The ion beams are caused to pursue a curved path and a particular beam of interest or frequently successive means is focussed on a collector electrode. The current produced on the collector electrode by the discharge of an ion beam is an index of the relative abundance of the ions composing the beam in the mixture being analyzed.

In present leak detection practice, a vessel or closed system under test is evacuated, and the gas pumped out of the system is analyzed in a mass spectrometer of the type described above or any other analytical apparatus. By playing a stream of helium or other gas foreign to the atmosphere within the vessel over the exterior of the vessel, the existence and the exact location of leaks may be detected by the appearance of helium in the gas being evacuated from the vessel. Helium is undoubtedly the gas most suited for this purpose since it is inert, is not present in the atmosphere to any appreciable extent, and because of the ease with which it penetrates even the smallest crack. In this latter respect, helium is similar to hydrogen which may also be used but which is objectionable because of its explosive property.

Another method of leak detection differs from that described above in that the test vessel is pressurized instead of evacuated, and leakage from interior to exterior is detected rather than leakage from exterior to interior. Leak testing by pressurizing has many advantages over leak testing of an evacuated vessel in accordance with conventional practice. Pressurized leak testing is highly sensitive and economical and is independent of size, shape or cleanliness of the vessel or system under test. Also it is well known that in many instances, leaks, not present under vacuum, will develop, or "open up" under high pressures as a result of deformation of the pressurized vessel. In this respect the vacuum method of leak testing is, for all practical purposes, limited to a differential of one atmosphere. A vessel which is to be used at high pressures may be leak free at one atmosphere differential but may develop leaks at operating pressures. The pressure method of leak testing enables one to pressurize a vessel above its designated operating pressure and test the vessel for leaks at such elevated pressures.

I have now developed a sampling or sniffing probe which facilitates pressure leak testing as described above. Briefly, the probe comprises an elongated tube attached at one end to a body. The body is adapted to be attached to a flexible conduit and provides a passageway between the conduit and the tube, the conduit being normally connected to a mass spectrometer or other analytical device. The free end of the tube has a constricted orifice through which gas is drawn into the tube and analytical system. An elongated needle extends coaxially through the tube and into the orifice and is adjustable therein to close the orifice completely or to restrict the gas flow therein. In other words, the needle and orifice form an adjustable leak which permits operation of the analytical device, say a mass spectrometer, at the maximum safe operating pressure. This pressure for a mass spectrometer, for example, may be on the order of $10^{-4}$ mm. of Hg absolute.

The apparatus of the invention will be more clearly understood from the following detailed description thereof taken in relation to the accompanying drawing in which:

Fig. 1 is a sectional elevation of the sampling probe;
Fig. 2 is a plan view of the probe of Fig. 1;
Fig. 3 is a perspective view of the tip of the sampling probe;
Fig. 4 is a partial section of a portion of the apparatus of Fig. 1;
Fig. 5 is a section of the tip of the probe showing a modification therein;
Fig. 6 shows the method of using the probe of Fig. 1;
Fig. 7 is a graph showing the minimum leak rate detectible with the probe tip of Fig. 1 and with the probe tip of Fig. 5; and
Fig. 8 is a graph showing the relative sensitivity of the probe as related to the pressure of helium in the vessel under test.

Referring to Figs. 1 to 4, the probe comprises a body 10 having a nipple 12 provided at one end thereof and an elongated passageway 13 projecting through the nipple and to a point adjacent the opposite end of the body. A bushing 14 is threaded into the side of the body and is sealed therein by a gasket O ring 15. An elongated tube 16 is swaged or otherwise affixed in the bushing 14. A tip 17 having a restricted orifice 18 is swaged or otherwise affixed in the opposite end of the tube 16. The orifice 18 in the end of the tip is protected from damage by lips 20, 21, 22, 23 extending beyond the opening of the orifice.

A needle 26 is suspended in the end of the tube on an elongated rod 27 extending coaxially through tube 16 and into and through the body 10. A bushing 28 is threaded into the body 10 diametrically opposite the bushing 14 and is sealed therein by a gasket O ring 29. Bushing 28 is drilled and tapped and a threaded shim 30 is inserted therein. The outer end of rod 27 is threaded into shim 30. A diaphragm 31 extends across the lower end of bushing 28 and seals around rod 27. Shim 30 extends above bushing 28 forming a head 30A. An adjusting knob 33 is mounted on head 30A with a screw 34. Rotation of wheel 33 causes the shim to travel in bushing 28. The displacement of the shim by rotation of knob 33 is a function of the pitch of the threads holding the shim in the bushing. The diaphragm 31 prevents rotation of rod 27 so that the shim rotates around the rod when the knob is turned. The net longitudinal displacement of the rod is thus determined by the relationship between the exterior and interior threading of the shim. If the exterior and interior threading is of different pitch, the rod will be displaced by rotation of the shim. Needle 26 is threaded into rod 27 and is held in the desired position by a nut 36.

Conveniently the exterior and interior threading on the shim are selected so that one revolution of wheel 33 will move the needle axially in the orifice only .006 inch. This results in a very smooth adjustment of the leak. To protect the needle against excessive closing pressure and the diaphragm from excessive stretching, stops are provided, limiting the travel of the knob to one revolution. This amount of adjustment is adequate for all conditions of operation. As shown in greater detail in Fig. 4, the stop means comprises a pair of lugs 38, 39 mounted in the lower face of knob 33 and the upper face of bushing 28 respectively. The lugs 38, 39 are mounted on the same radius so that one revolution of the knob in either direction will bring the lugs in contact with each other and prevent further turning of the knob.

A modification in the tip 17 is illustrated in Fig. 5. This modification includes a piece of flexible tubing 40 say rubber or neoprene which extends beyond the several protruding ridges 21, 23. For the reasons hereinafter described, the neoprene tubing 40, increases the sensitivity of the probe but at the same time restricts the area which the probe samples at any one position.

The operation of the probe is illustrated in Fig. 6 and is as follows:

A vessel 44 to be tested is pressurized with 100% helium or air or other gas containing an appreciable percentage of helium or other gas foreign to the atmosphere surrounding the vessel. The operator holds probe 46 and explores the exterior of the vessel with the tip 17. The probe is connected by means of a suitable flexible conduit 48 held over nipple 12 to an analytical instrument (not shown) say a mass spectrometer. At the beginning of the test, knob 33 is set at the closed position so that needle 26 will completely close orifice 18 (see Fig. 1). The mass spectrometer is then evacuated to operating pressures. After the mass spectrometer has pumped down, the knob 33 is slowly rotated to withdraw the needle partially from the orifice until the pressure on the mass spectrometer rises to the operating value of $10^{-4}$ mm. of Hg. The probe is now ready for use. The vacuum system of the leak detector draws the atmosphere to be tested through the restricted orifice of the probe. Because of the tremendously reduced pressure within the probe and analytical system, the gas drawn in through the tip is analyzed in the mass spectrometer almost immediately.

The sensitivity of the instrument depends upon the speed with which the probe tip moves over the surface of the vessel to be tested, the shape of the tip and its position with respect to the surface to be tested. It also depends upon the concentration and pressure of helium in the test vessel.

In Fig. 7, curve A shows the minimum leak rate detectible with the probe tip of Fig. 1 and curve B shows the minimum leak rate detectible with the sleeve arrangement of Fig. 5 as a function of linear probing speed and at a constant test pressure of 15 p. s. i. g. (pounds per square inch gauge). The data shown in Fig. 7 was obtained using a mass spectrometer of the type described above. From the graph of Fig. 7 it is readily apparent that the sleeve 40, shown in Fig. 5, increases the sensitivity of the probe from 10 to 100 times. At a linear probing speed of 1 foot per minute, the minimum leak detectible without the sleeve is $2 \times 10^{-5}$ cc./sec. at N. T. P. At the same linear probing speed the minimum leak detectible with the sleeve is approximately $8.6 \times 10^{-7}$ cc./sec. at N. T. P. The sleeve permits the area from which gas is drawn into the probe to be restricted by contacting the end of the sleeve with the vessel so that substantially only the atmosphere confined by the sleeve is drawn into the probe.

Fig. 8 shows a graph of the relative sensitivity of the probe as a function of the pressure of helium in p. s. i. g. in the test vessel. The relative sensitivity is based on the sensitivity of Fig. 1 as a norm or as one. Hence, to determine the size of a leak detectible at pressures other than 15 p. s. i. g., the detectible leak rate obtained from Fig. 7 for any given linear probing speed is divided by the relative sensitivity obtained from Fig. 8. For example, suppose a vessel containing pure helium under 150 p. s. i. g. pressure is to be probed without the rubber sleeve at a linear speed of three feet per minute. From Fig. 7, the leak rate detectible at 15 p. s. i. g. with the linear probing speed of three feet per minute is $4.5 \times 10^{-5}$ cc./sec. From Fig. 8, the relative sensitivity at 150 p. s. i. g. is 40. Dividing $4.5 \times 10^{-5}$ by 40 gives $1.125 \times 10^{-6}$ cc./sec. as the minimum leak rate detectible at 150 p. s. i. g.

Sensitivity varies directly with the concentration of helium in the pressurizing gas. Thus, if a 10% helium and 90% air mixture is used the sensitivity will be 10% of that when pure helium, at the same working pressure, is used. However, sensitivity varies approximately as the square of the absolute pressure. It is possible to employ this fact to great advantage, when pressurizing vessels, by working at reduced helium concentration and higher pressures. Since the helium consumed is a linear function of pressure, while sensitivity is a square function, it is obviously more economical to use reduced concentration and increased pressure. To illustrate the advantage thus gained, consider the sensitivity of the probe to a 100% helium pressurizing gas at 30 p. s. i. absolute as compared to the sensitivity to a 10% helium pressurizing gas at 300 p. s. i. absolute. In either case, the quantity of helium consumed is the same, but the sensitivity advantage according to Fig. 8 is 10% of 150 or about 15 to 1.

The graphs of Figs. 7 and 8 contain sufficient information to allow a fairly precise approach to any leak detecting problem. For economical reasons, it is desirable to establish the approximate maximum leak rate which can be tolerated. Knowing this figure, and assuming a testing pressure of at least 1.05 times the working pressure of the vessel, the concentration of helium needed in the pressurizing mixture for the required sensitivity may then be determined from the graphs.

I claim:

1. A sampling probe comprising a body, an elongated tube affixed to and projecting from the body and having an orifice in one end remote from the body, a needle mounted in the body which extends through the tube and into the orifice, the body having a passageway connected between the tube and the exterior of the body, and a conduit connecting said passageway with an analytical device.

2. A sampling probe comprising a body, an elongated tube affixed to and projecting from the body and having an orifice in one end remote from the body, a needle mounted in the body which extends through the tube into the orifice and means operable from the exterior of the body to adjust the needle longitudinally within the tube, the body having a passageway connected between the tube and the exterior surface of the body, and a conduit connecting said passageway with an analytical device.

3. A sampling probe comprising a body, an elongated tube affixed to and projecting from the body and having an orifice in one end remote from the body, a needle mounted in the body which extends through the tube and into the orifice a nipple formed on the body and spaced from the tube, the body having a passageway connected between the tube and the nipple formed on the exterior surface of the body formed on the exterior surface of the body, and a conduit connecting said nipple with an analytical device.

4. A sampling probe comprising a body, an elongated tube affixed to and projecting from the body, the tube having a tip containing an orifice affixed in the end remote from the body, a needle mounted in the body which extends through the tube and into the orifice in the tip, the body having a passageway connected between the tube and the exterior of the body, and a conduit connecting said passageway with an analytical device.

5. A sampling probe comprising a body having a passageway extending substantially through the body and opening at one end of the body, an elongated tube affixed to a wall of the body and opening into the inner end of the passageway, the tube having a tip containing an orifice affixed in the end remote from the body, a longitudinally adjustable rod mounted on the body and extending through the passageway and coaxially into the tube, a needle mounted on the end of the rod and extending into the tip, and means operable from the exterior of the body to adjust the rod and the needle longitudinally in the tip.

6. A sampling probe comprising a body having a passageway extending substantially through the body and opening at one end of the body, an elongated tube affixed to the body near the end of, and opening into, the passageway at the inner end thereof, the tube having a tip containing an orifice affixed in the end remote from the body, a tubular bushing mounted through the wall of said body opposite said tube, a threaded shim threaded through said bushing, a wheel mounted on the outer end of said shim for turning the shim in the bushing, an elongated rod threaded at one end into the inner end of said shim and extending diametrically across said passageway and coaxially through a major portion of said tube, the arrangement being such that rotation of said wheel displaces the rod longitudinally within the tube, a needle adjustably mounted to and extending coaxially from the end of the rod into the tip, and a flexible diaphragm sealed across the lower end of the bushing and around the rod.

7. Apparatus according to claim 6 provided with stop means for preventing rotation of said knob in excess of 360°.

8. Apparatus according to claim 6 wherein one revolution of said knob displaces the rod approximately .006 inches along the longitudinal axis of said tube.

9. Apparatus according to claim 6 wherein the pitch of the exterior and interior threads on the shim is different, and the rod is prevented from rotating by the diaphragm.

10. A sampling probe comprising a body, an elongated tube affixed to and projecting from the body, the tube having a tip containing an orifice affixed in the end remote from the body through which gas may be drawn into the tube, a sleeve mounted on the tip and projecting beyond the end of the tip, a needle mounted in the tube and extending into the orifice in the tip, the body having a passageway connected between the tube and the exterior of the body.

References Cited in the file of this patent

UNITED STATES PATENTS

| | | |
|---|---|---|
| 116,808 | Childs | July 11, 1871 |
| 649,337 | McDonald et al. | May 8, 1900 |
| 1,933,791 | Crouch | Nov. 7, 1933 |
| 2,153,105 | Szecsi | Apr. 4, 1939 |
| 2,172,575 | Caulfield | Sept. 12, 1939 |
| 2,218,899 | Warren | Oct. 22, 1940 |
| 2,486,199 | Nier | Oct. 25, 1949 |

OTHER REFERENCES

Chemical Engineering, April 1947, vol. 54, #4 entitled "Detecting Leaks" by J. E. Burroughs, pp. 112–114.

"Electronics Simulates Sense of Smell" by White and Hickey, Electronics, March 1948, pp. 100–102.

"How to Test for Leaks," J. R. Neff, Gen. Elect. Review, October 1949, pp. 41–44.